(12) United States Patent
Ichikawa

(10) Patent No.: US 7,026,849 B2
(45) Date of Patent: Apr. 11, 2006

(54) RESET CIRCUIT HAVING SYNCHRONOUS AND/OR ASYNCHRONOUS MODULES

(75) Inventor: Takeshi Ichikawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/812,923

(22) Filed: Mar. 31, 2004

(65) Prior Publication Data

US 2005/0116754 A1     Jun. 2, 2005

(30) Foreign Application Priority Data

Nov. 27, 2003   (JP) .............................. 2003-397765

(51) Int. Cl.
*H03L 7/00*        (2006.01)
(52) U.S. Cl. ...................... 327/142; 327/277
(58) Field of Classification Search ................ 327/143, 327/198, 276, 277, 142; 377/64–80, 83
See application file for complete search history.

(56) References Cited

U.S. PATENT DOCUMENTS

| | | | | |
|---|---|---|---|---|
| 3,083,907 A | * | 4/1963 | Crocker et al. ................ 377/33 |
| 4,620,180 A | * | 10/1986 | Carlton ........................ 341/100 |
| 4,697,279 A | * | 9/1987 | Baratti et al. .................. 377/73 |
| 4,745,302 A | * | 5/1988 | Hanawa et al. ............. 327/160 |
| 4,775,990 A | * | 10/1988 | Kamuro et al. ................ 377/77 |
| 4,958,274 A | * | 9/1990 | Dutton et al. ................ 713/600 |
| 5,164,970 A | * | 11/1992 | Shin et al. ...................... 377/54 |
| 5,187,725 A | * | 2/1993 | Eguchi et al. ................. 377/56 |
| 5,479,127 A | * | 12/1995 | Bui ............................. 327/174 |
| 5,708,382 A | * | 1/1998 | Park ............................. 327/277 |
| 5,912,570 A | * | 6/1999 | Kuusisto ...................... 327/142 |
| 6,384,646 B1 | * | 5/2002 | Ozawa ......................... 327/143 |
| 6,795,000 B1 | * | 9/2004 | Hummerston et al. ....... 341/141 |
| 6,873,192 B1 | * | 3/2005 | Kang et al. .................. 327/143 |
| 2005/0035796 A1 | * | 2/2005 | Chun et al. .................. 327/143 |
| 2005/0168259 A1 | * | 8/2005 | Yamawaki ................... 327/277 |

FOREIGN PATENT DOCUMENTS

JP          07-168652        7/1995

* cited by examiner

*Primary Examiner*—Terry D. Cunningham
(74) *Attorney, Agent, or Firm*—Nixon Peabody, LLP

(57) ABSTRACT

There is provided a reset circuit for reducing current consumption during resetting. A reset circuit 20 is constituted in such a manner that a pulse generation circuit 22 for generating a reset pulse signal (PRSTN) 50 from a reset signal input to an input terminal (RSTN) is connected to a plurality modules 10, 12, 14, a register 40 arranged in the module 10 is initialized based on the reset pulse signal (PRSTN) 50, a register 42 arranged in the module 12 of a next stage is initialized based on a module reset signal (MRSTN) 60 output from a control circuit 30 arranged in the module 10 of a previous stage, and a register 44 arranged in each of modules of stages thereafter, e.g., the module 14, is initialized based on a module reset signal (MRSTN) output from a control circuit 32 arranged in the module 12 of a previous stage.

9 Claims, 11 Drawing Sheets

RESET CIRCUIT HAVING SYNCHRONOUS AND/OR ASYNCHRONOUS MODULES

BACKGROUND OF THE INVENTION

1. Field of the Invention

The preset invention relates to a reset circuit for initializing a semiconductor integrated circuit, and more particularly to a reset circuit for initializing a plurality of modules arranged in a large-scale integrated circuit.

2. Description of the Related Art

A semiconductor integrated circuit has recently been integrated on a large scale (LSI) and constituted to include a plurality of modules which carry out parallel operations. Such a large-scale integrated circuit (LSI circuit, referred to as LSI hereinafter) comprises a reset input terminal which inputs a reset signal to initialize the plurality of modules. The reset signal supplied from the outside of the LSI to the reset input terminal is input to a register arranged in each module in the LSI. The register detects rising or falling of the reset signal to be reset, thereby setting an initial value. For example, when a reset signal that is changed from "1" (High level) to "0" (Low level) is supplied immediately after power is turned on, the plurality of modules in the LSI are initialized. Then, when the reset signal becomes "1", the resetting of the module is released to set a normal state.

Additionally, in the case of an LSI configuration in which each module functions in synchronization with a clock signal supplied thereto, upon reception of the reset signal from the outside of the LSI, each module is initialized in synchronization with rising or falling of the clock signal.

In this case, for example, an arithmetic element for calculating a logical product of a data input and a reset input, and a memory element (register) for storing various values are arranged in each module. An output of the arithmetic element is input to the register. The register fetches the logical product of the reset signal and the data input to output it in synchronization with the rising of the clock signal. Accordingly, when "0" is input as the reset input, "0" is fetched into the register to complete the initialization in synchronization with the rising of the clock signal.

When the reset input is "1", each module outputs indetermination. When the reset input becomes "0", each module is initialized in synchronization with the rising of the clock signal. Subsequently, when the reset signal becomes "1", the resetting of the module is released to set a normal state in synchronization with the rising of the clock signal.

However, in the case of the aforementioned LSI which comprises the plurality of modules, there is a problem that the registers arranged in all the modules in the LSI are initialized at timing when the reset signal becomes "0", and this initializing operation is accompanied by temporary flowing of a large current to the LSI. Additionally, the current continues to flow for a period in which the reset signal is held in the register until the reset signal is changed from "0" to "1" to release the resetting. Consequently, when power is consumed and, for example, in the case of an LSI incorporated in a device such as a wireless remote controller driven by a battery, there is a problem that a battery life is greatly affected.

Furthermore, in the conventional synchronous reset circuit, there is a problem that since all the registers in the LSI are simultaneously initialized in synchronization with the clock signal, a large current instantaneously flows to increase a maximum current consumption value, consequently affecting operations of peripheral circuits. In this case, the life of the battery used in the battery-driven device is affected similarly to the above.

SUMMARY OF THE INVENTION

The present invention provides a reset circuit which eliminates such conventional technical defects and reduces a consumption current at the time of resetting. The present invention is directed to a reset circuit which includes a plurality of modules from a first stage to a last stage for executing desired functions, and initializes each of the plurality of modules arranged in a semiconductor integrated circuit, and the reset circuit comprises input means for inputting a reset signal to initialize the plurality of modules; and pulse generation means connected to the input means to generate a reset pulse based on the reset signal, wherein the plurality of modules include a first module arranged at a first stage which is connected to an output of the pulse generation means and receives the reset pulse to be initialized, and a second module arranged at a next stage; the first module has first control means for generating a first reset signal to initialize the second module, and outputting the first reset signal to the second module after initialization in the first module; and the second module has second control means which is connected to an output of the first module, receives the first reset signal output from the first module to be initialized, generates a second reset signal to initialize a module arranged at a further next stage based on the first reset signal from the first module, and outputs the second reset signal after initialization in the second module.

DETAILED DESCRIPTION OF THE INVENTION

Figure 1:
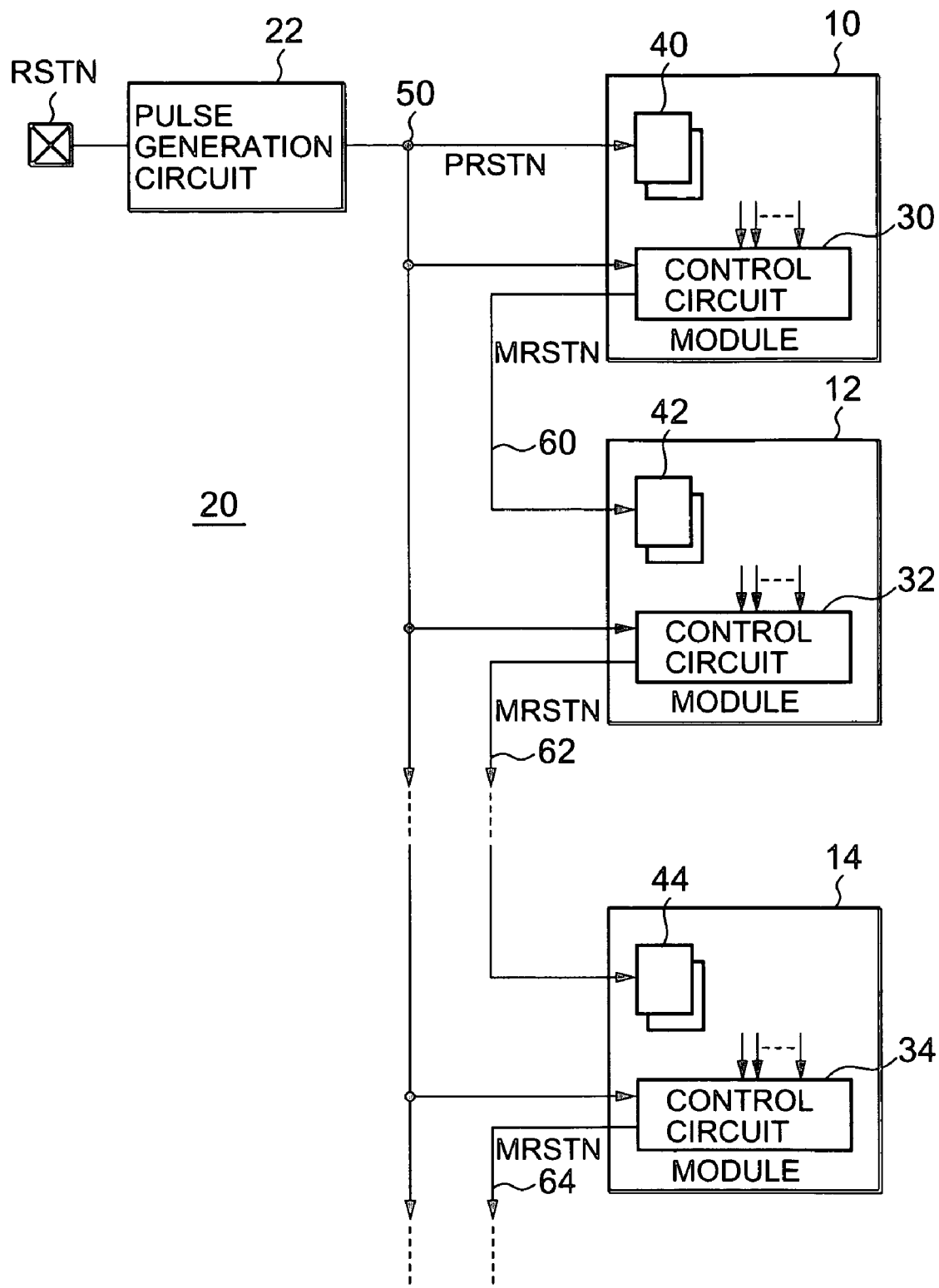
FIG. 1 is a block diagram showing a specific example of a reset circuit according to the preset invention.

Next, specific examples of reset circuits of the preset invention will be described in detail with reference to the accompanying drawings. Referring to FIG. 1, there is shown a specific example of a reset circuit 20 which initializes a plurality of modules 10, 12, ..., 14 arranged in a large-scale integrated circuit (LSI) asynchronously with a clock signal. In the description below, illustration and explanation of sections not directly related to the invention will be omitted, and a signal reference numeral will be represented by a reference numeral of a connection line of its appearance.

As shown, the reset circuit 20 comprises a pulse generation circuit 22 connected to an input terminal (RSTN), control circuits 30, 32, ..., 34 disposed in the plurality of modules 10 to 14, and registers 40, 42, ..., 44 which execute resetting operations in accordance with inputs. A reset signal is input to the input terminal (RSTN) from the outside of the LSI to initialize the modules 10 to 14.

Each of the modules 10 to 14 is a functional block of the LSI, and necessary registers are disposed therein corresponding to a plurality of circuit sections arranged in the module. The registers 40, 42, ..., 44 are memory circuits to store various values. For example, the module 10 comprises a plurality of registers 40.

The pulse generation circuit 22 outputs "1" (High level) at normal time. Upon detection of a "1" input (rising) to the input terminal RSTN, the pulse generation circuit 22 outputs a reset pulse signal (PRSTN) to an output 50 in order to change the normal time output "1" to a fixed time output "0" (Low level), and then recover the output "1". The output 50 of the pulse generation circuit 22 is connected to the modules 10 to 14 in the LSI.

Figure 2:
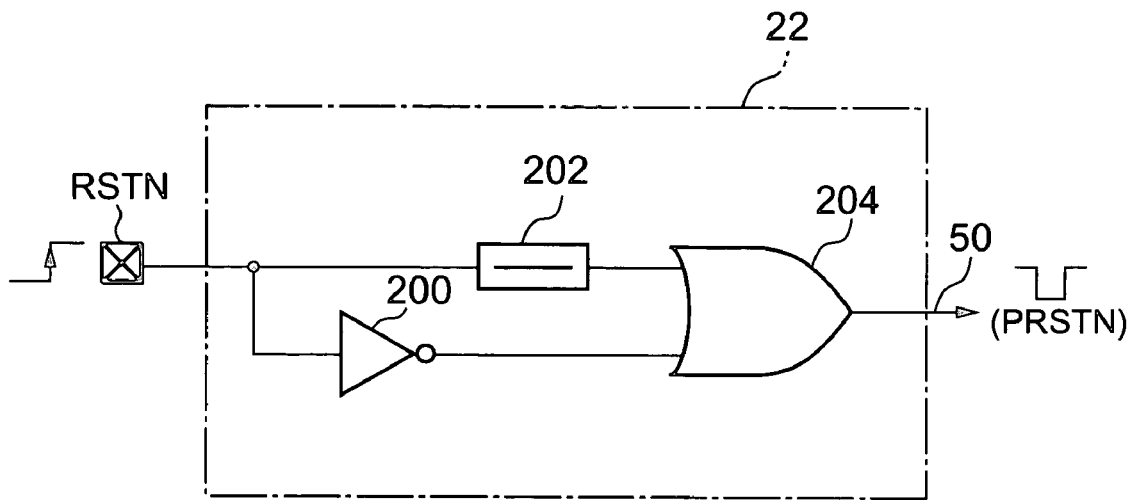
FIG. 2 is a view showing a constitutional example of a pulse generation circuit.

FIG. 2 shows an internal constitutional example of the pulse generation circuit 22. The pulse generation circuit 22 includes an inverting circuit 200 for inverting a reset signal (RSTN) input to the input terminal (RSTN), a delay circuit 202 for delaying the reset signal (RSTN) by fixed time, and a logical circuit 204 for calculating a logical sum of an output of the inverting circuit 200 and an output of the delay circuit 202 to be output to the output 50. The pulse generation circuit 22 of the constitutional example outputs "1" at normal time. Upon detection of a "1" input (rising) to the input terminal (RSTN), the pulse generation circuit 22 outputs a pulse signal of a pulse width for outputting a change from the output "1" to a fixed time output "0" in synchronization with the rising, and then recovering the output "1" as a reset pulse signal (PRSTN) to the output 50.

Figure 3:
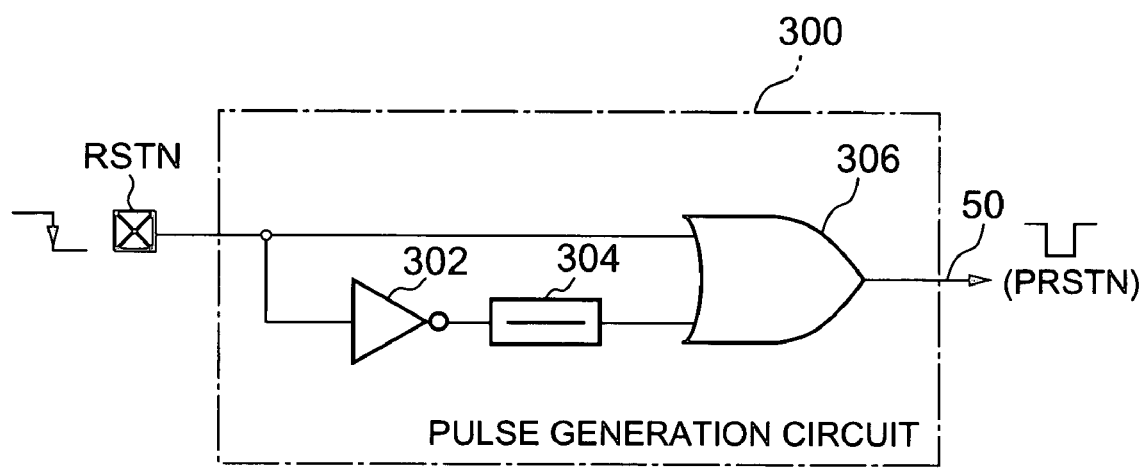
FIG. 3 is a view showing another constitutional example of a pulse generation circuit.

FIG. 3 shows another constitutional example of the pulse generation circuit 22. As shown, a pulse generation circuit 300 outputs "1" at normal time. Upon detection of a "0" input (falling) to the input terminal (RSTN), the pulse generation circuit 300 outputs a pulse signal of a pulse width for changing the output "1" to a fixed time output "0", and then recovering the output "1" as a reset pulse signal (PRSTN) to the output 50. This pulse generation circuit 300 includes an inverting circuit 302 for inverting a reset signal (RSTN) input to the input terminal (RSTN), a delay circuit 304 for delaying an output of the inverting circuit 302 by fixed time to output it, and a logical circuit 306 for calculating a logical sum of the reset signal (RSTN) and an output of the delay circuit 304, and outputting a rest pulse signal (PRSTN) which is a result of the calculation to the output 50. The pulse generation circuit 300 may be used in place of the aforementioned pulse generation circuit 22.

Returning to FIG. 1, the output 50 of the pulse generation circuit 22 is connected to the plurality of registers 40 and the control circuit 30 disposed in the module 10 of the first stage. For the modules 12 and 14 of a next stage and after, the output 50 is connected to the control circuits 32 and 34 therein. Further, an output 60 of the control circuit 30 in the module 10 is connected to the plurality of registers 42 arranged in the module 12, and the control circuit 32 in the module 12 is connected to the pluralities of registers arranged in the modules of stages thereafter. In the description below, an output 62 of the control circuit 32 is connected to the plurality of registers 44 in the module 14 as one of the modules of the stages thereafter.

The control circuit 30 arranged in the module 10 of the first stage is connected to the output (PRSTN) 50 of the pulse generation circuit 22 to generate and output a module reset signal (MRSTN) 60 for the module 12 of the next stage. The control circuits 30, 34 arranged in the modules of the second stage and after receive module reset signals (MRSTN) 60, 62 supplied from the control circuits 30, 32 arranged in the modules 10 and 12 of the previous stages and the reset pulse signal (PRSTN) from the pulse generation circuit 22 to generate and output module reset signals (MRSTN) 62, 64 for the modules 12, 14 of the subsequent stages. The module reset signal (MRSTN) outputs 60, 62, 64 of the control circuits 30, 32, 34 are connected to the registers disposed in the modules of the subsequence stages to store various values, and each register is initialized in the module.

Figure 4:
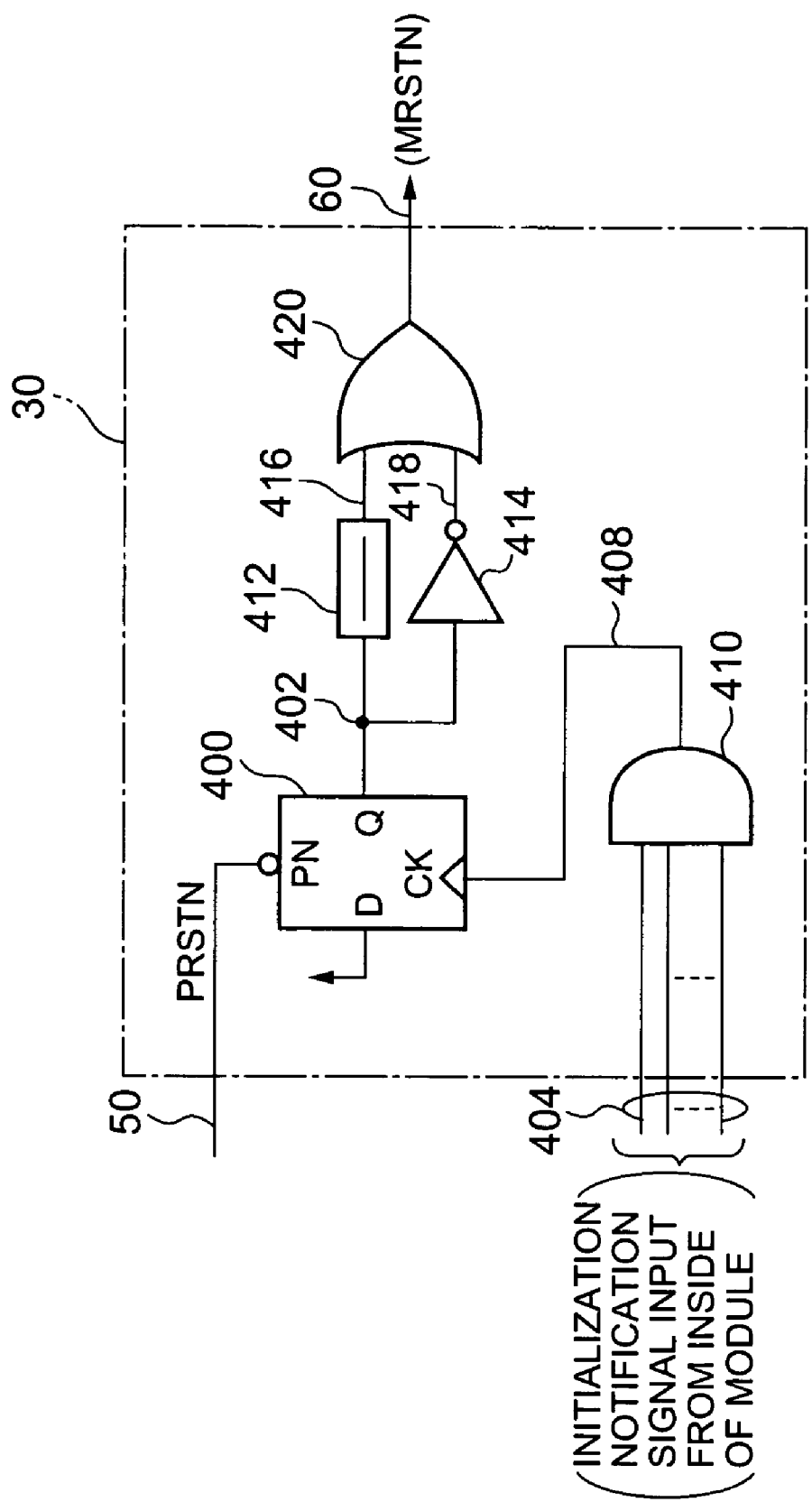
FIG. 4 is a view showing a constitutional example of a control circuit.

Now, description will be made of an internal constitutional example of the control circuit 30 arranged in the module 10. As shown in FIG. 4, the control circuit 30 includes a holding circuit 400 connected to the output (PRSTN) 50 of the pulse generation circuit 22 to receive and hold the reset pulse signal (PRSTN) in a preset input (RN), and to output a held value to an output (Q) 402 in accordance with an input to a clock input (CK), and a logical circuit 410 which receives an initialization notification signal 404 indicating completion of initialization from a plurality of circuit sections (not shown) arranged in the module 10, and outputs a logical product thereof to an output 408 to be supplied to the clock input (CK) of the holding circuit 400. The logical circuit 410 has a function of detecting an end of initialization in the module. The plurality of circuit sections includes registers 40.

The output (Q) 402 of the holding circuit 400 is connected to a delay circuit 412 for delaying an input signal by fixed time to output it, and an inverting circuit 414 for inverting and outputting the input signal. Outputs 416, 418 of the delay circuit 412 and the inverting circuit 414 are connected to a logical circuit 420 for calculating a logical sum of these output values. An output (MRSTN) 60 of the logical circuit 420 constitutes an output 60 of the control circuit 30, and is connected to the register 42 of the module 12 of the next stage shown in FIG. 1.

Figure 5:
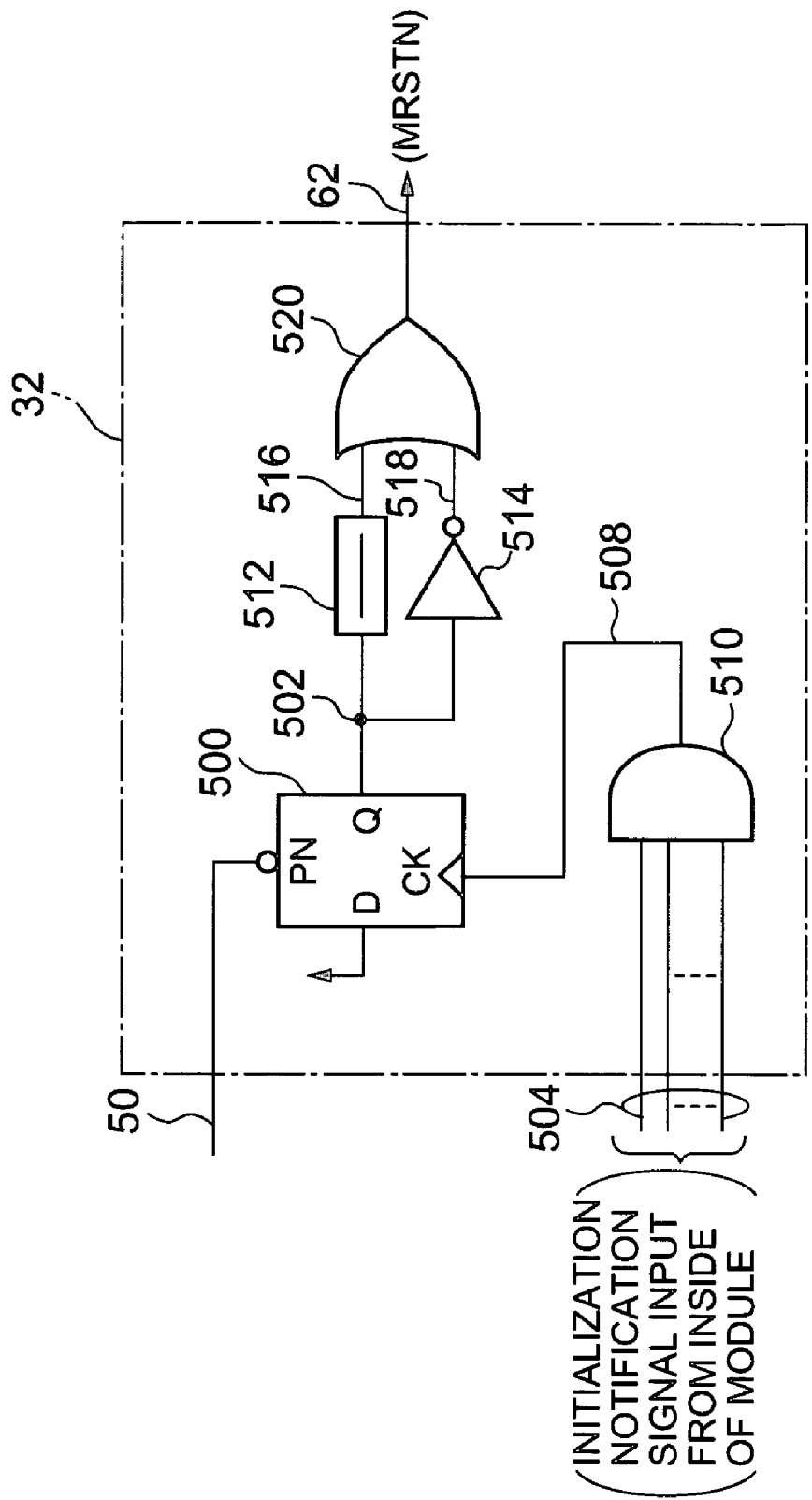
FIG. 5 is a view showing a constitutional example of a control circuit of a next stage.

The control circuit 32 disposed in the module 12 may be similar in constitution to the control circuit 30 regarding resetting. As shown in FIG. 5, the control circuit 32 includes a holding circuit 500 connected to the output (PRSTN) 50 of the pulse generation circuit 22, a logical circuit 510 which receives a plurality of initialization notification signals 504 from the module 12, and outputs a logical product thereof to an output 508 to be supplied to a clock input (CK) of the holding circuit 500, and a logical circuit 520 connected to a delay circuit 512 for delaying an output (Q) 502 of the holding circuit 500 to output it and an inverting circuit 514 for inverting the output (Q) 502 to calculate a logical sum of outputs 516, 518 thereof. An output (MRSTN) 62 of the logical circuit 520 constitutes an output 62 of the control circuit 32. The output 62 is connected to a plurality of registers 44 arranged in a module of a next stage, e.g., the module 14.

An operation of the reset circuit 20 of the foregoing constitution will be described. Upon detection of rising of a reset signal (RSTN) which is input from the outside of the LSI and changed from "0" to "1", the pulse generation circuit 22 outputs a reset pulse signal (PRSTN) 50 in synchronization with the rising in order to output fixed time "0" and then recover "1". The reset pulse signal (PRSTN) 50 is input to the control circuits 30 to 34 in the modules 10 to 14, and the plurality of modules 40 in the module 10.

Figure 6:
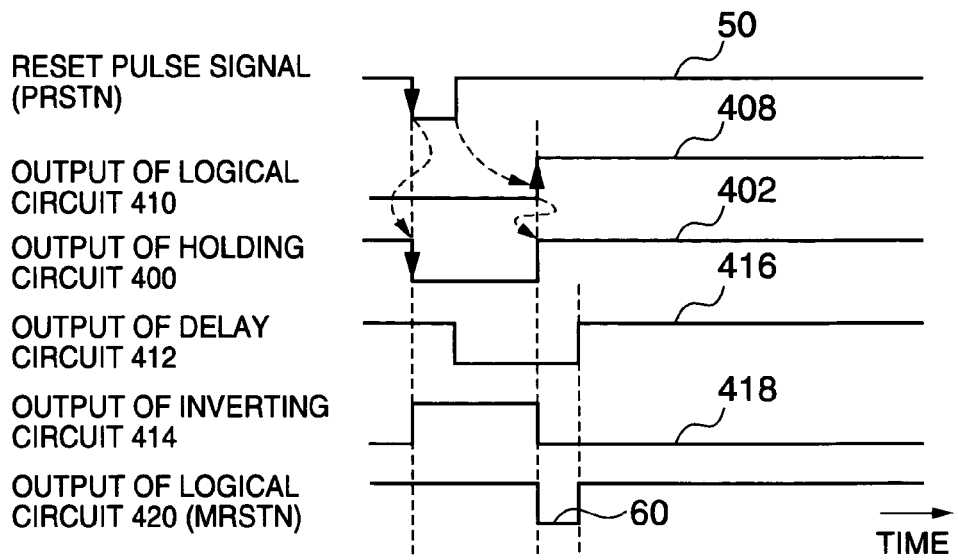
FIG. 6 is a timing chart showing a generation operation of a module reset signal (MRSTN)

Description will be made of an operation of the control circuit 30 arranged in the module 10 of the first stage in which the reset pulse signal (PRSTN) 50 is directly input to the register 40. As shown in FIG. 6, the holding circuit 400 receives an output "0" of the reset pulse signal (PRSTN) 50 output from the pulse generation circuit 22 to be initialized, thereby outputting "0". Additionally, when the reset pulse signal (PRSTN) 50 is input to the registers 40, the registers 40 in the module 10 are sequentially initialized.

Upon completion of the initialization of the registers 40, the logical circuit 410 that has received all the initialization notification signals 404 outputs a logical product "1" thereof. The holding circuit 400 outputs "1" to the output 402 upon reception of the output "1" from the logical circuit 410. The delay circuit 412 delays the output 402 of the holding circuit 400 by fixed time to output it, and the inverting circuit 414 inverts and outputs the output 402. The logical circuit 420 outputs a logical sum of an output 416 of the delay circuit 412 and an output 418 of the inverting circuit 414 as a module reset signal (MRSTN) to the output 60. The output of the module reset signal (MRSTN) is a reset pulse for initializing the module of the next stage.

Figure 7:
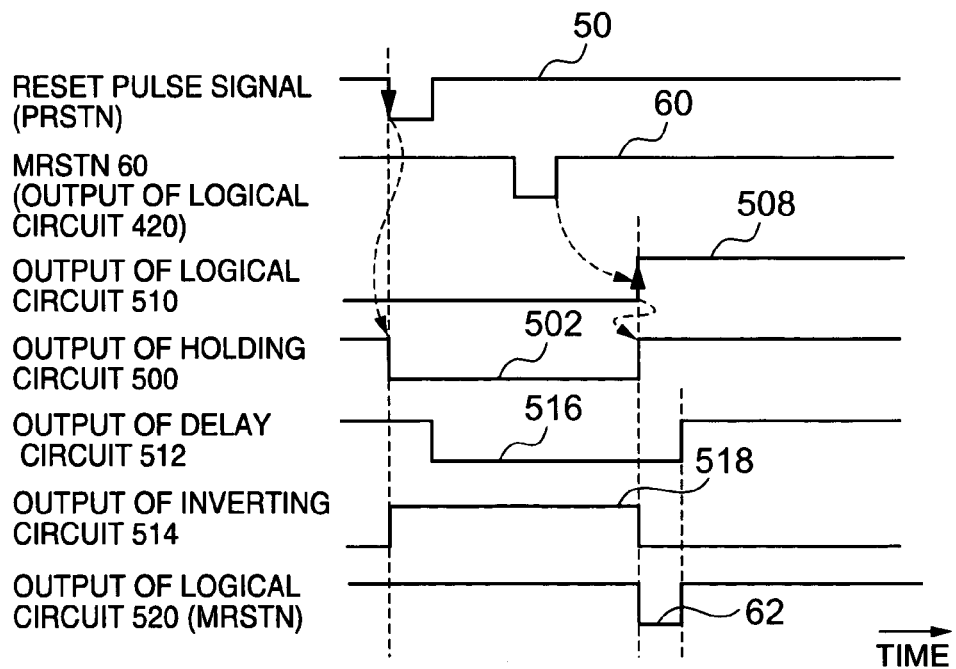
FIG. 7 is a timing chart showing a generation operation of a module reset signal (MRSTN)

The module reset signal (MRSTN) 60 is input to the control circuit 32 in the module 12 of the next stage. As shown in FIG. 7, upon reception of an output "0" of the reset pulse signal (PRSTN) 50 from the pulse generation circuit 22, the holding circuit 500 in the control circuit 32 is initialized to output "0". Additionally, the module reset signal (MRSTN) 60 from the control circuit 30 arranged at the previous stage is input to the plurality of registers 42 in the module 12, and the registers 42 in the module 12 are sequentially initialized.

Upon completion of the initialization of the registers 42, the logical circuit 510 that has received an initialization notification signal 504 outputs "1". The holding circuit 500 outputs "1" to the output 502 upon reception of the output "1" from the logical circuit 510. The delay circuit 512 delays the output 502 of the holding circuit 500 by fixed time, and the inverting circuit 514 inverts the output 502. The logical circuit 520 outputs a logical sum of an output 516 of the delay circuit 512 and an output 518 of the inverting circuit 514 as a module reset signal (MRSTN) 62 to the output 62. The module reset signal (MRSTN) 62 is input to, e.g., the control circuit 34 in the module 14 among the modules of the subsequent stages. As in the case of the control circuit 32, in the control circuit 34, a module reset signal (MRSTN) is generated for the module of a further next stage.

Figure 8:
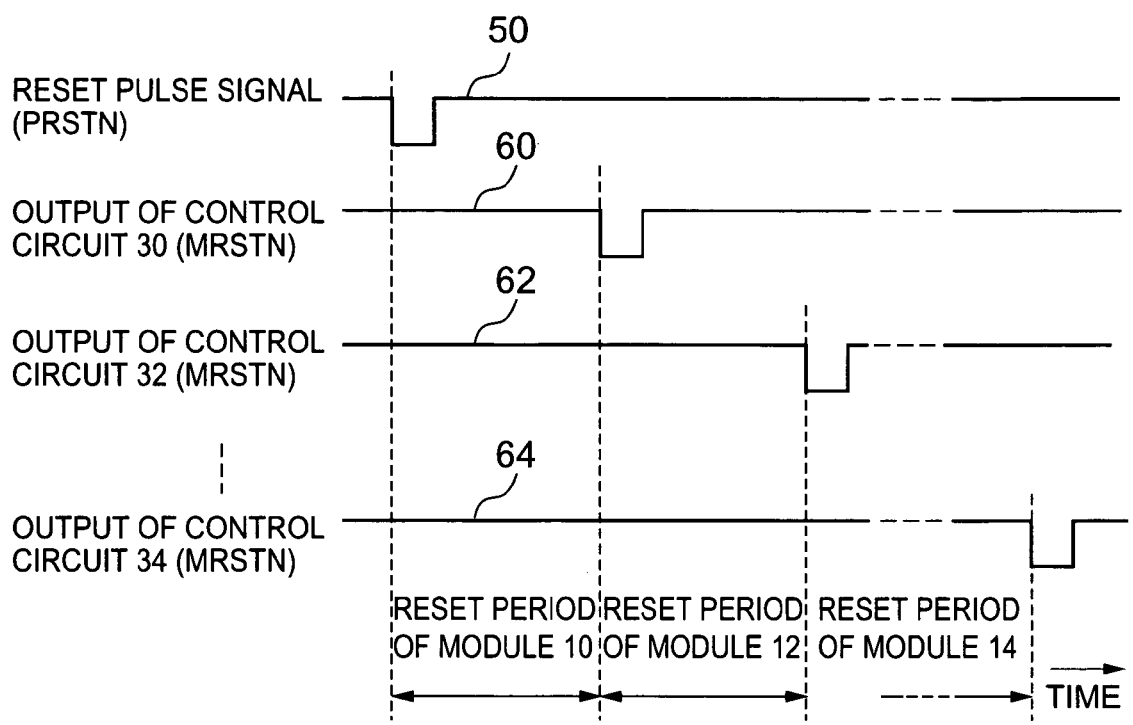
FIG. 8 is a timing chart showing a reset period of each module.

Thus, for the plurality of modules 10, 12, 14, as shown in FIG. 8, one module is initialized within a fixed period by "0" inputs from the reset pulse signal (PRSTN) 50 supplied from the pulse generation circuit 22 and the module reset signals (MRSTN) 62, 64 supplied from the control circuits 30, 32 arranged in the modules of the previous stages, and the modules thereafter are sequentially initialized for each one module.

As described above, the rest pulse signal (PRSTN) 50 output from the pulse generation circuit 22 is input to each module, and the module reset signal (MRSTN) generated in the module of the previous stage among the modules is supplied to the module of the next stage. By this constitution, in the module of the first stage, the plurality of registers 40 therein are initialized based on the reset pulse signal (PRSTN) 50. In the module 12 of the second stage, the plurality of registers 42 therein are reset based on the module reset signal (MRSTN) 60 output form the module 10 of the first stage in which the resetting has been completed. Thereafter, in each module, the registers therein are initialized upon reception of the module reset signal (MRSTN) from the module of the previous stage, a new module reset signal (MRSTN) is generated to be supplied to the module of the next stage, and the generated module reset signal (MRSTN) is supplied to the module of the next stage.

Incidentally, for the module arranged at the last stage, the registers therein may be initialized based on the module reset signal (MRSTN) supplied from the module arranged at the previous stage. In this case, none of the aforementioned circuits 30 to 34 may be disposed in the module of the last stage.

According to the foregoing constitution, since initialization of the module of the next stage is inhibited before the end of the initialization for each module to enable dispersion of execution timing for initialization, it is possible to reduce a maximum value of currents supplied at the same timing. Moreover, different from a system of delaying an input reset signal by using only a delay circuit, there is no layout dependence, and timing designing of the reset circuit is facilitated in LSI designing.

Furthermore, for the module 10 of the first stage, the time of initializing the registers 40 can be shortened based on the reset pulse signal (PRSTN) output from the pulse generation circuit 22. Thus, it is possible to greatly reduce a value of a current which constantly flows in the module during resetting.

Figure 9:
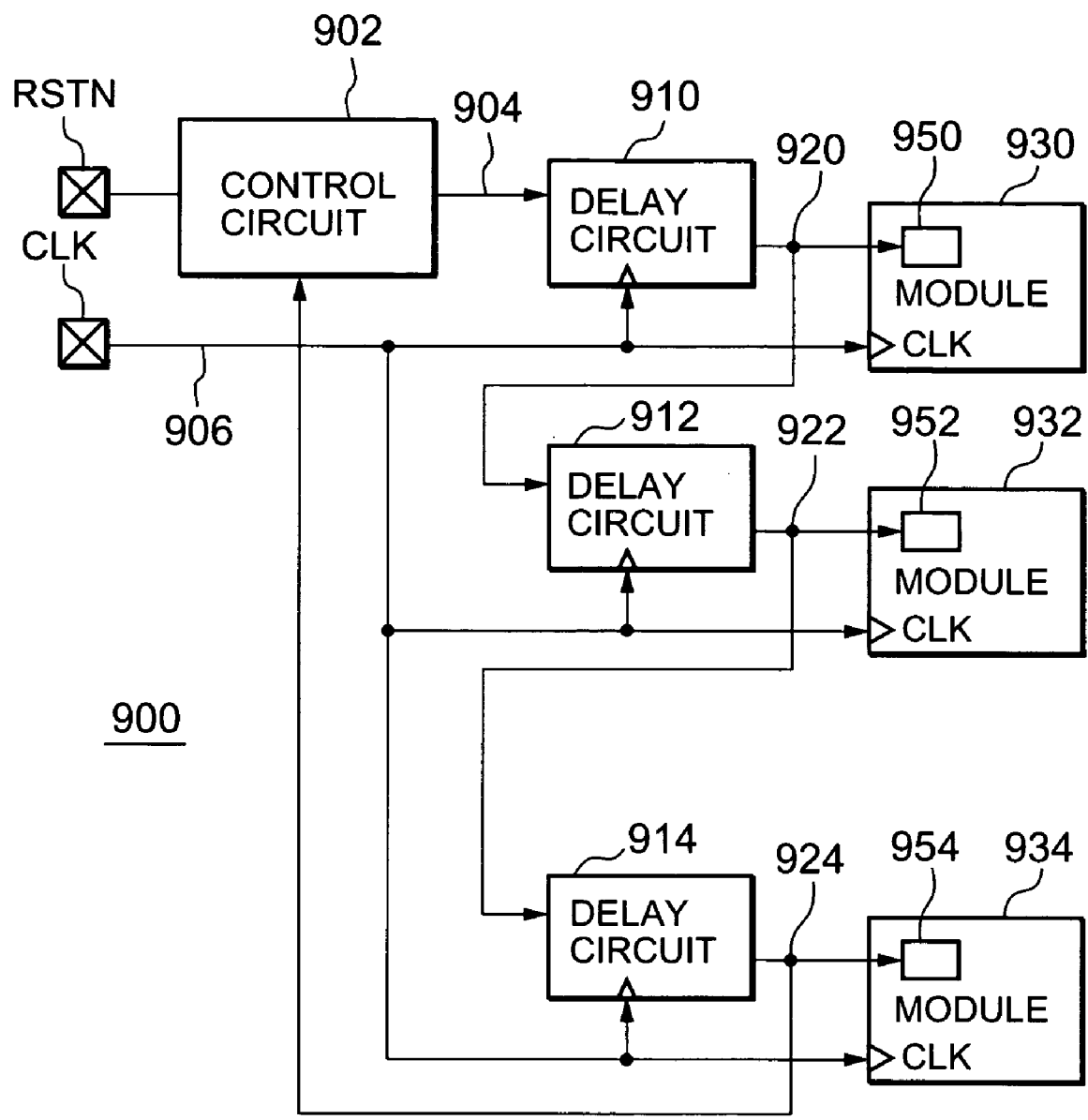
FIG. 9 is a block diagram showing another specific example of a reset circuit.

Next, description will be made of another specific example of a reset circuit to which the present invention is applied with reference to FIG. 9. The reset circuit of the specific example is a synchronous reset circuit in which each module is initialized in synchronization with a clock signal (CLK). As shown in FIG. 9, a reset circuit 900 synchronously resets a plurality of modules arranged in a large-scale integrated circuit (LSI). A control circuit 902 is connected to an input terminal (RSTN) which receives a reset signal (RSTN) supplied from the outside of the LSI, and a delay circuit 910 is connected to an output 904 of the control circuit 902. An output 920 of the delay circuit 910 is connected to a module 930 of a first stage and a delay circuit 912 of a second stage. An output 922 of the delay circuit 912 is connected to a module 932 of a second stage and a delay circuit 914 of a next stage. An output 924 of the delay circuit 914 is connected to the module 934 and the control circuit 902.

A clock terminal (CLK) is connected through a connection line 906 to the control circuit 902, the delay circuits 910, 912, 914, and the modules 930, 932, 934. The modules 930 to 934 connected to the outputs 920, 922, 924 of the plurality of delay circuits 910, 912, 914 are synchronously reset in synchronization with the clock signal (CLK). The LSI further comprises a number of modules. However, in the description below, it is assumed that the LSI comprises the control circuit 902, the delay circuits 910 to 914, and the modules 930 to 934.

The input terminal (RSTN) receives a reset signal (RSTN) from the outside of the LSI. The reset signal (RSTN) is in a normal sate when an input is "1", and initializes the internal circuit of the LSI in synchronization with a clock signal (CLK) when an input is "0".

Figure 10:
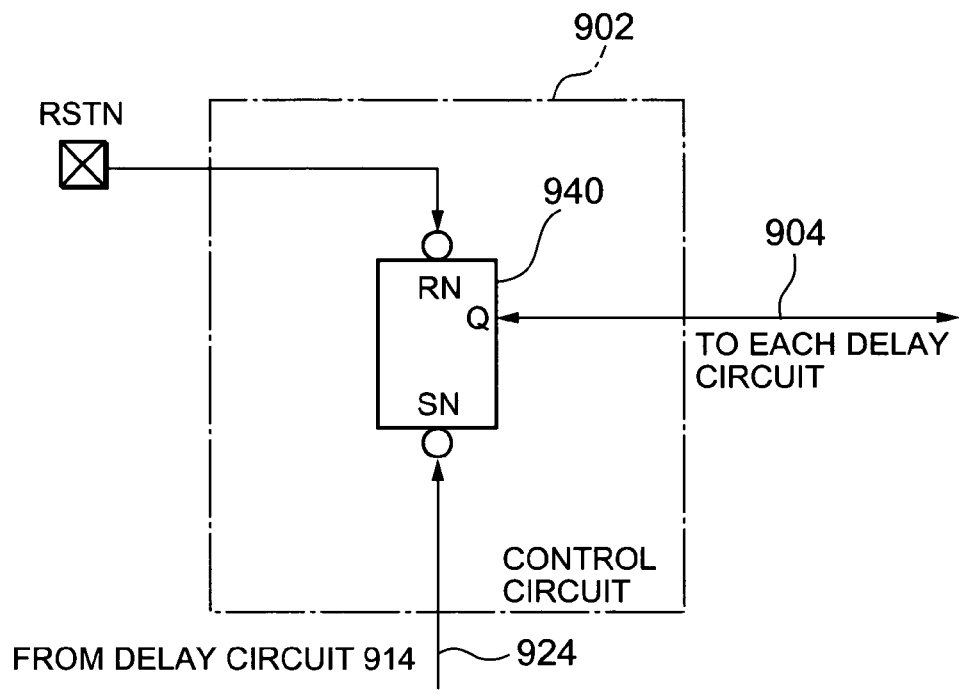
FIG. 10 is a view showing a constitutional example of a control circuit.

As shown in FIG. 10, the control circuit 902 includes a flip-flop 940 of a set/reset type, inputs the reset signal (RSTN) to an input (RN), and inputs the output 924 of the delay circuit 914 to an input (SN). The flip-flop 940 is reset to output an output "0" to the output 904 upon detection of "0" (falling) of the reset signal (RSTN). Next, the control circuit 902 connects the output 924 of the delay circuit 914 disposed corresponding to the module 934 arranged at a last stage, and is set to output an output "1" to the output 904 upon detection of "0" (falling) of the output signal 924 of the delay circuit 914.

Returning to FIG. 9, each of the delay circuits 910, 912, 914 fetches an input signal in synchronization with rising of a clock signal (CLK) 906, and delays the input level thereof by predetermined time to output it. The delay circuit 910 receives the output 904 of the control circuit 902, and outputs the input level thereof as a delayed reset signal 920 at next clock timing. The delay circuit 912 of the next stage receives the delayed reset signal 920 output from the delay circuit 910 of the previous stage, and further outputs this as a delayed reset signal 922 to the output 922 at next clock timing. Similarly, the delay circuit 914 arranged at the last stage in the specific example receives the delayed reset signal 922 delayed and output from the delay circuit 912 of the previous stage, and further outputs this as a delayed reset signal 924. This output 924 is connected to the module 934 and the control circuit 902. The control circuit 902 outputs "1" to the output 904 upon detection of falling of the delayed reset signal 924 from the delay circuit 914 of the last stage.

The delay circuits connected to the modules are serially connected, and the module of each stage receives the delayed reset signal delayed and output at each block timing in accordance with a connection order of each delay circuit.

Figure 11:
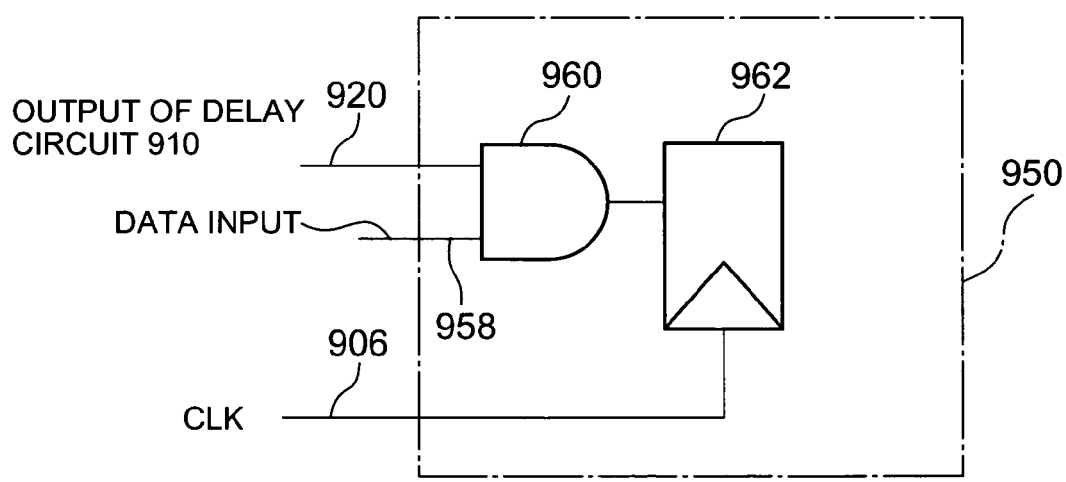
FIG. 11 is a view showing a constitutional example of a register circuit.

The modules 930 to 934 are functional blocks of the LSI, and a plurality of modules are arranged in the LSI. Pluralities of register circuits 950, 952, 954 are respectively arranged in the modules. FIG. 11 shows a constitution of the register circuit 950. The register circuit 950 receives a delayed reset signal 920 from the delay circuit 910, calculates a logical product of the signal 920 and a data input 958 supplied from the LSI at the logical circuit 960, and inputs a calculation output to the register 962. The register 962 fetches the logical product of the input 920 and the data input 958 to output it in synchronization with rising of the clock signal (CLK) 906. Thus, when "0" is input to the input 920, "0" is fetched into the register 962 in synchronization with the rising of the clock signal (CLK) 906 to complete the initialization.

Furthermore, when the outputs 920 to 924 of the delay circuits 910 to 914 are "1", the modules output indetermination. When the outputs 920 to 924 become "0", the modules 930 to 934 are initialized in synchronization with the rising of the clock signal (CLK) 906. Subsequently, when the outputs 920 to 924 become "1", the resetting of the modules 930 to 934 is released in synchronization with the rising of the clock signal (CLK) 906 to set them in normal states.

Figure 12:
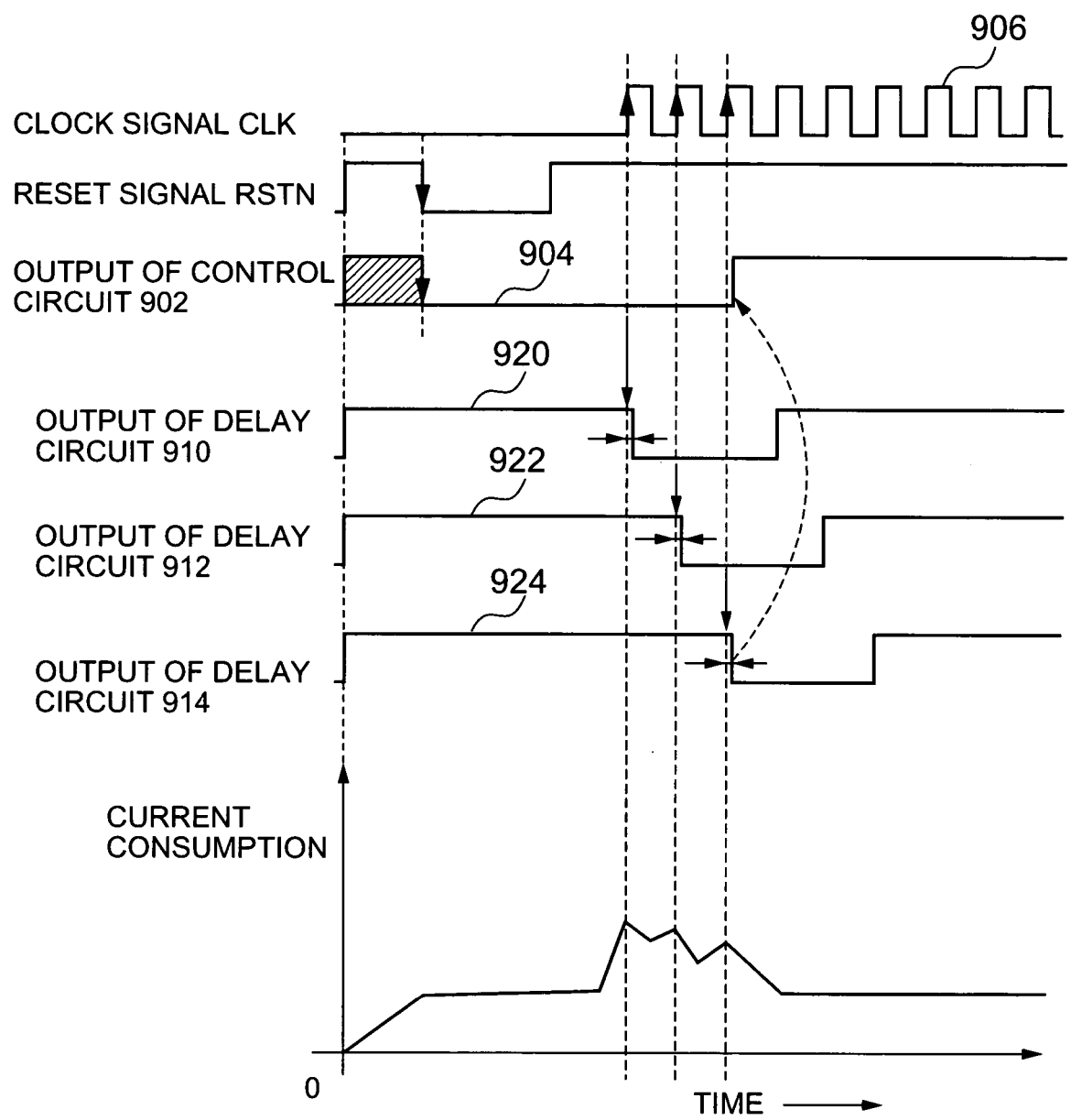
FIG. 12 is a timing chart showing an operation of the reset circuit and a view showing current consumption.

Description will be made of an operation of the reset circuit 900 constituted in the foregoing manner with reference to FIG. 12. The drawing shows a time chart to indicate the operation of the reset circuit.

When the input terminal (RSTN) receives a reset signal to be changed from "1" to "0", the control circuit 902 outputs "0" to the delay circuit 910. The output "0" of the control circuit 902 functions as a control signal to hold an output value corresponding to the reset signal for a period until a delayed reset signal 924 is input to the module 934 arranged at the last stage.

Here, when a clock signal (CLK) is supplied to the clock terminal (CLK) to set the input terminal (RSTN) to "1" a delayed reset signal 920 is output from the delay circuit 910 in synchronization with rising of the clock signal (CLK). The register circuit 950 of the module 930 receives this delayed reset signal 920 to be initialized. The delayed reset signal 920 is also input to the delay circuit 912 of the next stage.

The delay circuit 912 delays the delayed reset signal 920 by predetermined time in synchronization with the rising of the clock signal (CLK), and a delayed reset signal 922 is output from the delay circuit 912. The register circuit 952 of the module 932 receives this delayed reset signal 922 to be initialized. The delayed reset signal 922 is similarly input to the delay circuit 914 of the next stage, and a reset signal 924 delayed by predetermined time is input to the register circuit 954 of the module 934, whereby the register 934 is initialized. The delayed reset signal 924 generated at the delay circuit 914 of the last stage is output to the control circuit 902. Upon reception of the delayed reset signal 924 of "0" output from the delay circuit 914, the control circuit 902 outputs "1" to the output 904.

Thus, the registers in the modules arranged at the stages receive the delayed reset signals output from the delay circuits to be sequentially initialized, whereby a normal initial state is set.

Therefore, since the constitution is employed in which reset timing is shifted from module to module, when the modules are initialized, as shown, the amount of a current supplied at a time is lowered to enable reduction of a maximum value of current consumption. Additionally, even if the reset signal from the outside of the LSI is input before the input of the clock signal (CLK) at the time of starting the LSI such as power application, it is possible to synchronously reset the internal modules in sequence after the input of the clock signal.

Figure 13:
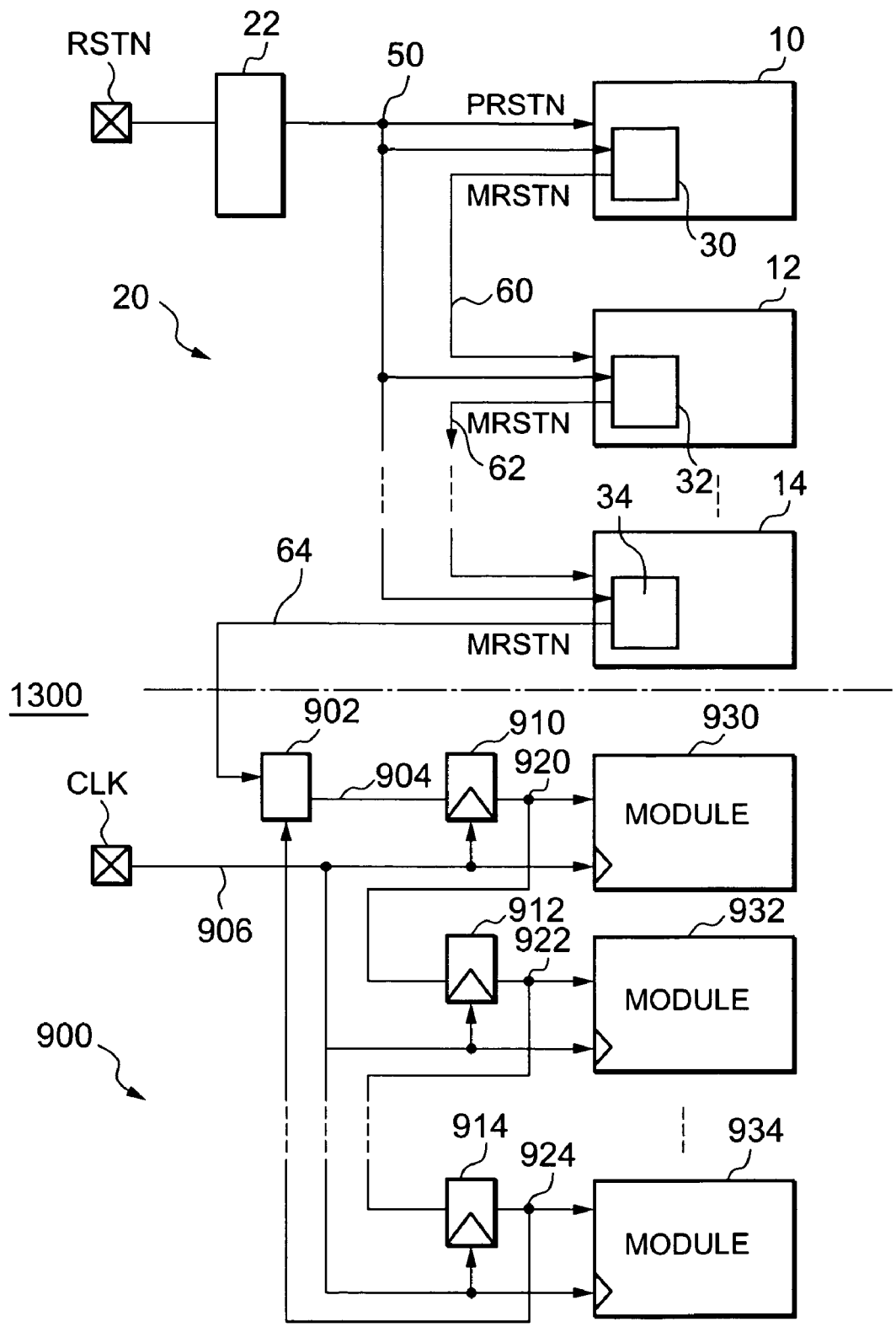
FIG. 13 is a block diagram showing another specific example of a reset circuit.

Incidentally, a constitution can be employed in which the reset circuit 20 of FIG. 1 and the reset circuit 900 of FIG. 9 are arranged in the same LSI, and the modules arranged therein are initialized. This constitutional example is shown in FIG. 13. According to the shown constitution, the output 64 of the reset circuit 20 shown in FIG. 1 is connected to the control circuit 902 in the reset circuit 900, and a module reset signal (MRSTN) is input to the control circuit 902.

Figure 14:
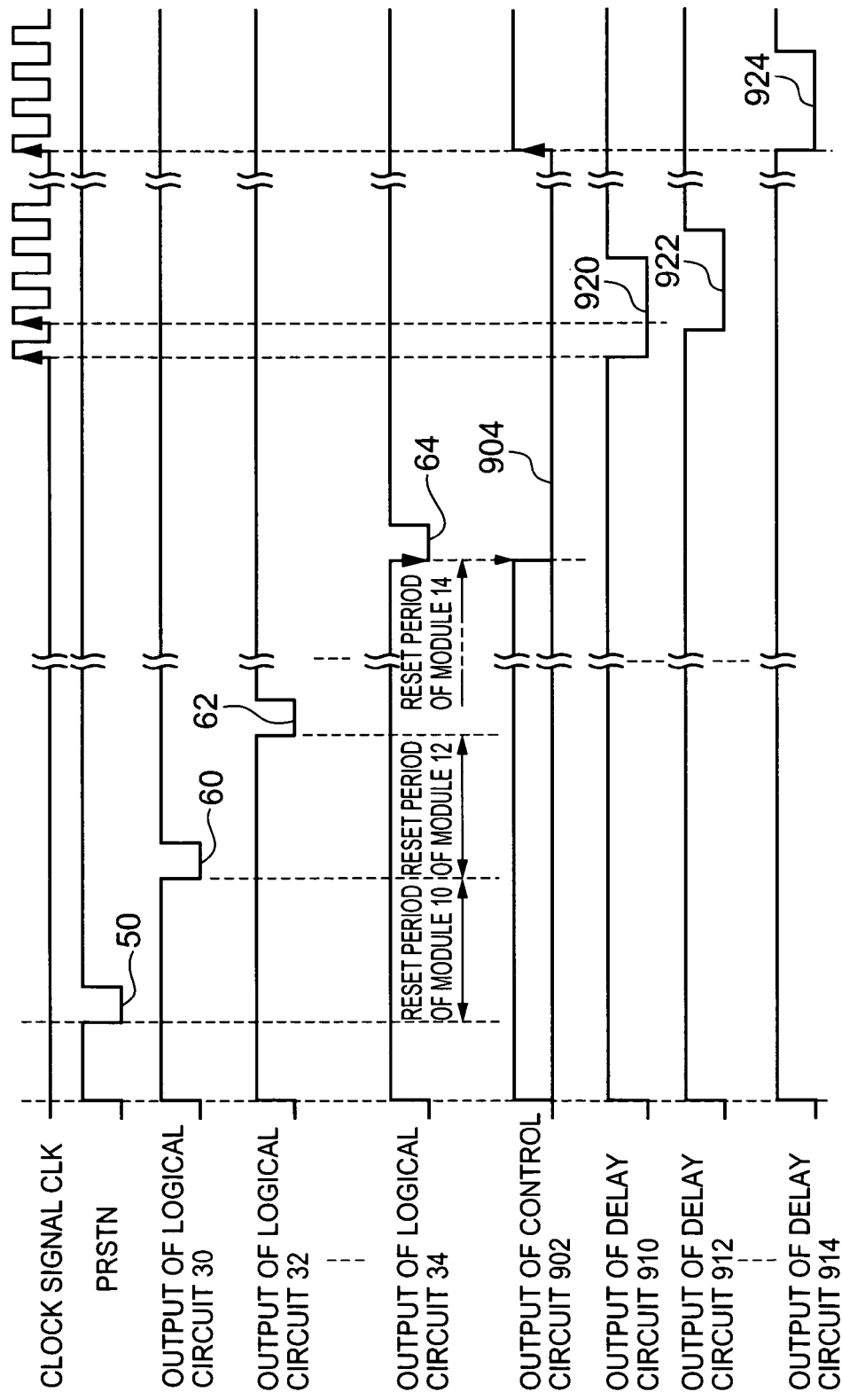
FIG. 14 is a timing chart showing asynchronous and synchronous resetting operations.

According to the foregoing constitution, as shown in FIG. 14, the plurality of modules 10, 12, ..., 14 are initialized by the reset circuit 20. Further, when the module reset signal 64 (MRSTN) output from the module 14 is input to the reset circuit 900, the plurality of modules 930, 932, ..., 934 are sequentially initialized in synchronization with the clock.

Thus, according to the specific example, in the constitution in which the asynchronous modules and the synchronous modules are mixed in the LSI, asynchronous resetting and synchronous resetting can be carried out in response to one reset signal input to the input terminal. Since the modules are sequentially initialized, it is possible to greatly reduce a current consumption value at predetermined timing during the initialization operation.

What is claimed is:

1. A reset circuit which includes a plurality of asynchronous modules and a plurality of synchronous modules from a first state to a last stage for executing desired functions, and initializes each of the pluralities of asynchronous and synchronous modules arranged in a semiconductor integrated circuit, comprising:
- input means for inputting a reset signal to initialize the plurality of asynchronous modules; and
- pulse generation means connected to the input means to generate a reset pulse based on the reset signal, wherein:
- the plurality of asynchronous modules include a first asynchronous module arranged at a first stage, which is connected to an output of the pulse generation means and receives the reset pulse to be initialized, and a second asynchronous module arranged at a next stage;
- the first asynchronous module has first control means for generating a first reset signal to initialize the second asynchronous module, and outputting the first reset signal to the second asynchronous module after initialization in the first asynchronous module; and
- the second asynchronous module has second control means which is connected to an output of the first asynchronous module, receives the first reset signal output from the first asynchronous module to be initialized, generates a second reset signal to initialize an asynchronous module arranged at a further next stage based on the first reset signal from the first asynchronous module, and outputs the second reset signal after initialization in the second asynchronous module, the reset circuit further comprising:
- clock input means for inputting a clock signal;
- third control means connected to the second asynchronous module to output, upon detection of the second reset signal, a control signal corresponding to the second reset signal for a period until a last delayed reset signal is input for a synchronous module of a last stage; and
- a plurality of delay means connected to the clock input means to delay an input signal in synchronization with the clock signal, and to output a delayed reset signal generated by the delaying, wherein:
- the plurality of synchronous modules are connected corresponding to the plurality of delay means, operated in synchronization with the clock signal, and initialized in synchronization with the clock signal based on the control signal and the delayed reset signal; and
- among the plurality of delay means, first delay means arranged at a first stage receives the control signal output from the third control means as the input signal, and each of second delay means arranged at stages thereafter receives the delayed reset signal output from delay means arranged at a previous stage as the input signal.

2. A reset circuit embedded in a large-scale integrated circuit, comprising:
- an input terminal which receives a reset signal of the large-scale integrated circuit from outside;
- a pulse generation circuit connected to the input terminal, which generates a reset pulse signal by performing a logical operation with the reset signal;
- a first module connected to the pulse generation circuit, wherein the first module comprises:
- a first register connected to the pulse generation circuit, which is reset in response to the reset pulse signal; and
- a first control circuit connected to the pulse generation circuit, which generates a first module reset signal by performing a logical operation with the reset pulse signal; and
- a second module connected to the pulse generation circuit and the first module, wherein the second module comprises:
- a second register connected the first control circuit of the first module, which is reset in response to the first module reset signal; and
- a second control circuit connected to the pulse generation circuit, which generates a second module reset signal by performing a logical operation with the reset pulse signal.

3. The reset circuit according to the claim 2, wherein the pulse generation circuit comprises:
- a delay circuit connected to the input terminal, which delays the reset signal;
- an inverting circuit connected to the input terminal, which inverts a potential level of the reset signal; and
- an OR circuit connected to the delay circuit and the inverting circuit, which performs a logical OR operation with the delayed reset signal and the inverted reset signal, causing the reset pulse signal to be generated.

4. The reset circuit according to claim 3, wherein the first control circuit of the first module comprises:
- an AND circuit generating a clock signal by performing a logical AND operation with a plurality of initialization notification signals;
- a flip-flop circuit connected to the pulse generation circuit, wherein the flip-flop circuit holds the reset pulse signal and outputs the held reset pulse signal on the basis of the clock signal;
- a second delay circuit connected to the flip-flop circuit, which delays the output held reset signal;
- a second inverting circuit connected to the flip-flop circuit, which inverts a potential level of the output held reset signal; and
- a second OR circuit connected to the second delay circuit and the second inverting circuit, which performs a logical OR operation with the delayed output held reset signal and the inverted output held reset signal, causing the first module reset signal to be generated.

5. The reset circuit according to the claim 2, wherein the pulse generation circuit comprises:
- an inverting circuit connected to the input terminal, which inverts a potential level of the reset signal;
- a delay circuit connected to the inverting circuit, which delays the inverted reset signal; and
- an OR circuit connected to the input terminal and the inverting circuit, which performs a logical OR operation with the reset signal and the delayed inverted reset signal, causing the reset pulse signal to be generated.

6. The reset circuit according to claim 5, wherein the first control circuit of the first module comprises:
- an AND circuit generating a clock signal by performing a logical AND operation with a plurality of initialization notification signals;
- a flip-flop circuit connected to the pulse generation circuit, wherein the flip-flop circuit holds the reset pulse signal and outputs the held reset pulse signal on the basis of the clock signal;
- a second delay circuit connected to the flip-flop circuit, which delays the output held reset signal;
- a second inverting circuit connected to the flip-flop circuit, which inverts a potential level of the output held reset signal; and
- a second OR circuit connected to the second delay circuit and the second inverting circuit, which performs a logical OR operation with the delayed output held reset signal and the inverted output held reset signal, causing the first module reset signal to be generated.

7. A reset circuit embedded in a large-scale integrated circuit, comprising:
   an input terminal which receives a reset signal having a first and second potential levels;
   a clock terminal which receives a clock signal;
   a control circuit connected to the input terminal, which generates a signal having the second potential level when the reset signal having the second potential level is input until a second delay reset signal is input;
   a first delay circuit connected to the control circuit and the clock terminal, which generates a first delay reset signal using the signal output from the control circuit in synchronization with the clock signal;
   a second delay circuit connected to the first delay circuit and the clock terminal, which generates the second delay reset signal using the first delay reset signal in synchronization with the clock signal;
   a first module connected to the first delay circuit, wherein the first module comprises a first register circuit which is initialized in synchronization with the clock signal and the first delay reset signal; and
   a second module connected to the second delay circuit, wherein the second module comprises a second register circuit which is initialized in synchronization with the clock signal and the second delay reset signal.

8. The reset circuit according to claim 7, wherein the control circuit comprises a set/reset type flip-flop having a first input terminal which receives the reset signal and a second input terminal which receives the second delay reset signal.

9. The reset circuit according to claim 8, wherein the first register of the first module comprises:
   an AND circuit performing a logical AND operation with the first delay reset signal and a data; and
   a register connected to the AND circuit, which fetches the output of the AND circuit in synchronization with the clock signal.

* * * * *